(12) United States Patent
Calderone et al.

(10) Patent No.: US 7,558,695 B2
(45) Date of Patent: Jul. 7, 2009

(54) SELF-POWERED VEHICLE SPEED SENSOR

(75) Inventors: Theodore Calderone, San Carlos, CA (US); Doug Finlay, Emerald Hills, CA (US)

(73) Assignee: SpeedInfo, LLC, San Jose, CA (US)

( * ) Notice: Subject to any disclaimer, the term of this patent is extended or adjusted under 35 U.S.C. 154(b) by 46 days.

(21) Appl. No.: 10/915,946

(22) Filed: Aug. 10, 2004

(65) Prior Publication Data

US 2006/0033642 A1 Feb. 16, 2006

(51) Int. Cl.
*G01P 7/00* (2006.01)
(52) U.S. Cl. .............. 702/142; 702/143; 702/146; 702/147; 73/488; 73/657; 73/167; 73/514.27; 340/995.13; 342/104; 342/194; 342/70; 701/208; 701/214
(58) Field of Classification Search ......... 702/142, 702/149; 342/70, 104, 194–196; 340/429, 340/444, 463, 466–467, 933, 936; 73/488
See application file for complete search history.

(56) References Cited

U.S. PATENT DOCUMENTS

| | | | | | |
|---|---|---|---|---|---|
| 4,231,039 | A | * | 10/1980 | Fritzlen et al. | 342/116 |
| 4,302,746 | A | * | 11/1981 | Scarzello et al. | 340/938 |
| 4,356,489 | A | * | 10/1982 | Hirota et al. | 342/71 |
| 4,414,548 | A | * | 11/1983 | Carpenter et al. | 342/117 |
| 4,887,080 | A | * | 12/1989 | Gross | 340/937 |
| 4,985,705 | A | * | 1/1991 | Stammler | 342/69 |
| 5,016,017 | A | * | 5/1991 | Kodera et al. | 342/106 |
| 5,177,432 | A | * | 1/1993 | Waterhouse et al. | 324/166 |
| 5,402,346 | A | * | 3/1995 | Lion et al. | 701/117 |
| 5,590,217 | A | * | 12/1996 | Toyama | 382/104 |
| 6,104,336 | A | * | 8/2000 | Curran et al. | 342/70 |
| 6,121,898 | A | * | 9/2000 | Moetteli | 340/933 |
| 6,208,268 | B1 | * | 3/2001 | Scarzello et al. | 324/174 |
| 6,266,627 | B1 | * | 7/2001 | Gatsonides | 702/143 |
| 6,445,337 | B1 | * | 9/2002 | Reiche | 342/104 |
| 6,483,452 | B1 | * | 11/2002 | Iwakini | 342/20 |
| 6,583,754 | B2 | * | 6/2003 | Mertins et al. | 342/104 |
| 6,666,089 | B2 | * | 12/2003 | Dilz, Jr. | 73/488 |
| 2003/0225516 | A1 | * | 12/2003 | DeKock et al. | 701/214 |
| 2005/0021292 | A1 | * | 1/2005 | Vock et al. | 702/182 |
| 2005/0113111 | A1 | * | 5/2005 | Dupont et al. | 455/456.1 |
| 2006/0150724 | A1 | * | 7/2006 | Byrne | 73/146 |

OTHER PUBLICATIONS

Henderson, Darren. "The State of the Practice in HOV System Performance Monitoring". Aug. 1, 2002. pp. 7-8. [Retrieved on Mar. 6, 2006]. Retrieved from the Internet: <URL:www.hovworld.com/reports_assets/TRB2003_001442.pdf>.*

(Continued)

*Primary Examiner*—Tung S Lau
*Assistant Examiner*—Sujoy K Kundu
(74) *Attorney, Agent, or Firm*—Van Pelt, Yi & James LLP

(57) ABSTRACT

Sensing vehicle speed is disclosed. A speed sensor is self powered. The speed sensor measures a speed data of multiple vehicles with one Doppler pulse. A sample is taken of speed sensor data from the speed sensor. The sample of speed sensor data is processed to calculate speed. The calculated speed is wirelessly transmitted to a server.

16 Claims, 6 Drawing Sheets

OTHER PUBLICATIONS

Louis G. Neudorff, P.E., et al."Freeway Management and Operations Handbook". Report No. FHWA-OP-04-003 [online]. Sep. 2003. Chapter 9. [Retrieved on Mar. 7, 2006]. Retrieved from the Internet: <URL:http://ops.fhwa.dot.gov/freewaymgmt/freeway_mgmt_handbook/chapter9_02.htm>.*

Keller, Gerald; Brain Warrack and Henry Bartel. "Statistic for management and economics". Belmont, California, 1994. 3rd Edition. pp. 225-239. ISBN:0-534-17772-7.*

James D. Carvell, Jr. et al. "Freeway Management and Operations Handbook". Report No. FHWA-SA-97-064 [online]. Aug. 1997. Chapter 6, pp. 16-28. [Retrieved on Mar. 10, 2006]. Retrieved from the Internet: <URL:http://web.archive.org/web/20030626050012/www.itsdocs.fhwa.dot.gov/JPODOCS/REPT_MIS/5L701!.PDF>.*

Keller et al., *Statistics for Management and Economics*, Book, 1994, Duxbury Press by Wadsworth Publishing Company, Belmont, CA.

Darren Henderson, AICP, *The State of the Practice in HOV System Performance Monitoring*, Paper, Aug. 1, 2002, pp. 1-22, TRB 2003 Annual Meeting CD-ROM, Orange, CA.

Neudorff et al., *Freeway Management and Operations Handbook*, Technical Report, http://www.ops.fhwa.dot.gov/freewaymgmt/freeway_mgmt_handbook/report_info.htm, Mar. 9, 2006, Washington, D.C.

* cited by examiner

SELF-POWERED VEHICLE SPEED SENSOR

FIELD OF THE INVENTION

The present invention relates generally to sensing vehicle speed. More specifically, a self-powered vehicle speed sensor is disclosed.

BACKGROUND OF THE INVENTION

Vehicle speed sensors are frequently expensive and require power, a dedicated communication line, or both. Thus, these wire connections for the vehicle speed sensors require substantial infrastructure (and hence investment) in order to widely proliferate speed sensors. It would be helpful to have a vehicle speed sensor that was self-powered so that it does not require a wire connection for power. In addition, it would also be helpful to have a vehicle sensor that does not require a wire connection to communicate its information.

Vehicle speed sensors usually have very specific mounting requirements. Some are buried in the road pavement; others must be mounted very close to the vehicle lane on a separate pole. It would be very helpful to have a speed sensor with a long sensing range, enabling it to be mounted in many different locations and still work effectively.

Self-powered speed sensors are usually very bulky. They require large solar panels and lots of batteries for backup power. Often, they are too bulky and weigh too much to be installed on existing light poles or sign posts. It would be helpful to have a self-powered speed sensor that used very little power, shrinking the amount of batteries required and reducing the load on the pole.

Current vehicle speed sensing equipment measures the speed of one vehicle at a time. It would be helpful to measure the speed of multiple vehicles at once on a section of road while distinguishing vehicle direction and whether or not the vehicle was using a high-occupancy vehicle (HOV) lane.

Many vehicle speed sensors are difficult to install and calibrate. It would be helpful to have a speed sensor that is self-calibrating and could be installed in a matter of minutes.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and invention may be practiced according to the claims without some or all of these specific details. For the purpose of clarity, technical material that is known in the technical fields related to the invention has not been described in detail so that the invention is not unnecessarily obscured.

Figure 1:
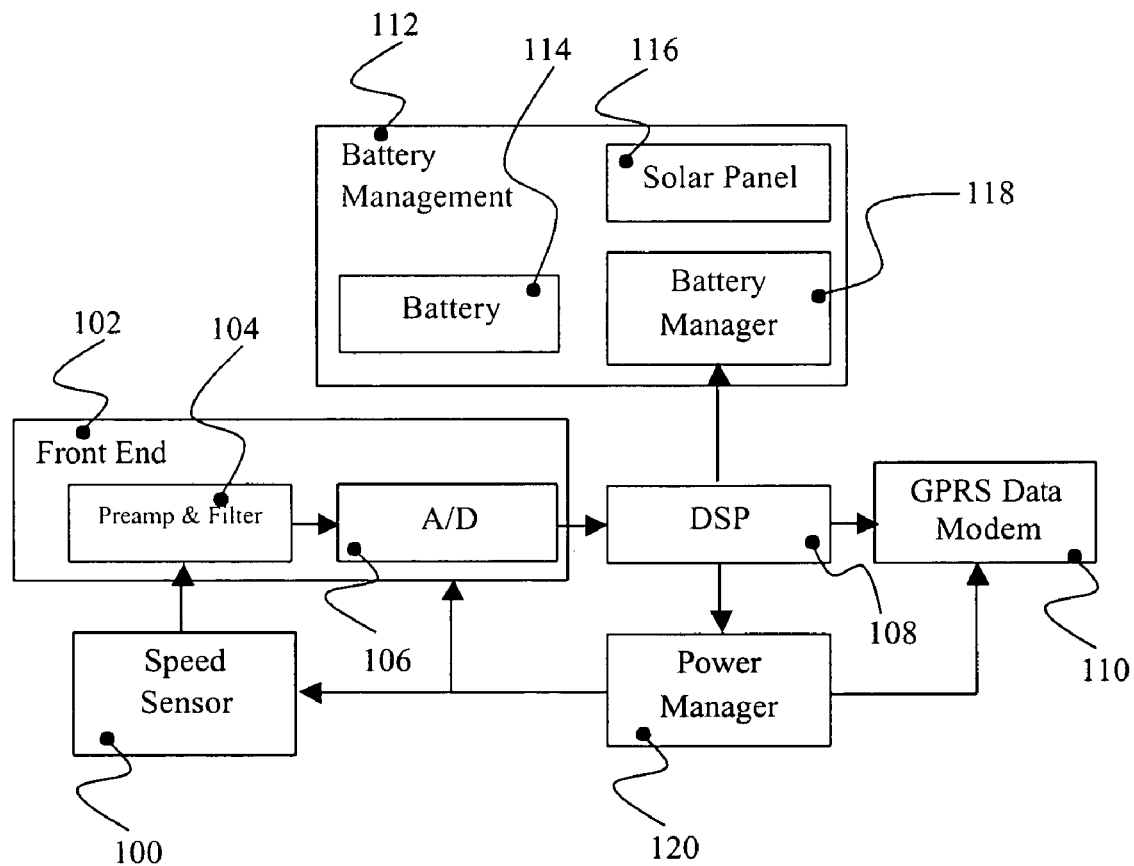
FIG. 1 is a block diagram illustrating a self-powered vehicle speed sensor system.

FIG. 1 is a block diagram illustrating a self-powered vehicle speed sensor system. In one embodiment, speed sensor 100 sends its signal to front end 102. Front end 102 includes a preamp and filter 104, which amplifies and filters the data signal from the sensor, and an analog-to-digital (A/D) converter 106, which digitizes the data signal from the sensor. Digital signal processor (DSP) 108 then processes the digitized data signal. The processed information is then sent using wireless data modem 110 to a centralized server. DSP 108 also controls the battery manager 1 18, which is part of the overall battery management system 112. The battery management system 112 controls a) charging of battery 114 from solar panel 116 and also b) providing power from either battery 114 or solar panel 116 to the rest of the speed sensor system. Power manager 120 intelligently turns on and off subsystems to efficiently use the power provided by the battery management system 112. The battery management system 112 and the power manager 120 allow the speed sensor system to be self-powered from the solar panel. It is not necessary to attach the speed sensor system to an electric power supply wire. This also makes the speed sensor system easy to install because no wires need to be connected to the speed sensor system. In addition, because of the power management system, the battery can be small and this reduces the weight of the speed sensor system.

In some embodiments, speed sensor 100 is a Doppler speed sensor, which has a microwave source and receiver that is designed to measure the speed of objects using the Doppler shift in the back-reflected microwaves.

The power manager 120 intelligently controls the frequency and duration of the speed measurements. If the traffic is moving at a normal speed, the measurements, or samples, are less frequent than if the traffic is very slow. In addition, the power manager 120 would also lower the frequency of samples when the battery power is low to preserve power until the next charging time.

Figure 2:
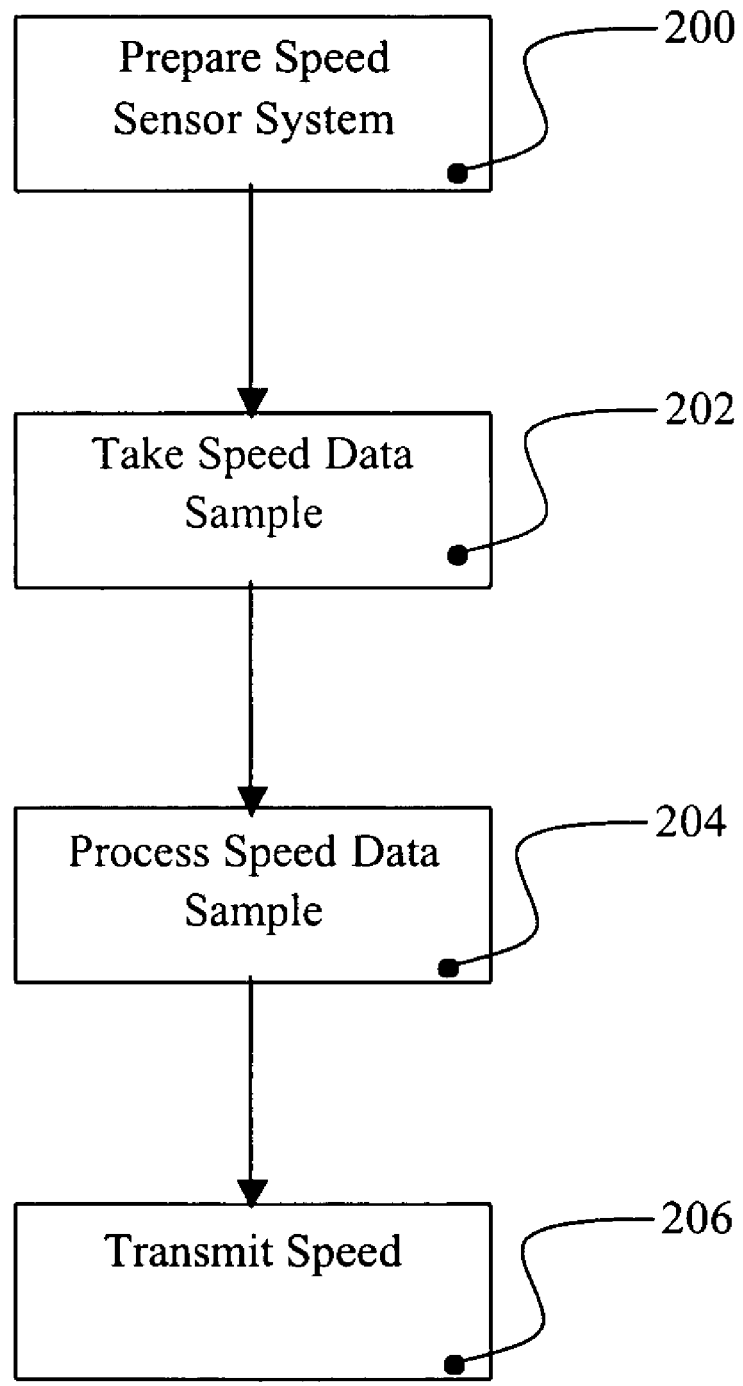
FIG. 2 is a flow chart illustrating the steps of operation of the self-powered vehicle speed sensor system.

FIG. 2 is a flow chart illustrating the steps of operation of the self-powered vehicle speed sensor system. In step 200, the speed sensor system prepares to take a measurement. Because the power manager turns off power hungry circuitry except when necessary, the system needs to turn on and stabilize the measurement electronics. In step 202, the speed data sample is acquired. In step 204, the speed data sample is processed. In step 206, the speed information is transmitted to a centralized server.

Figure 3:
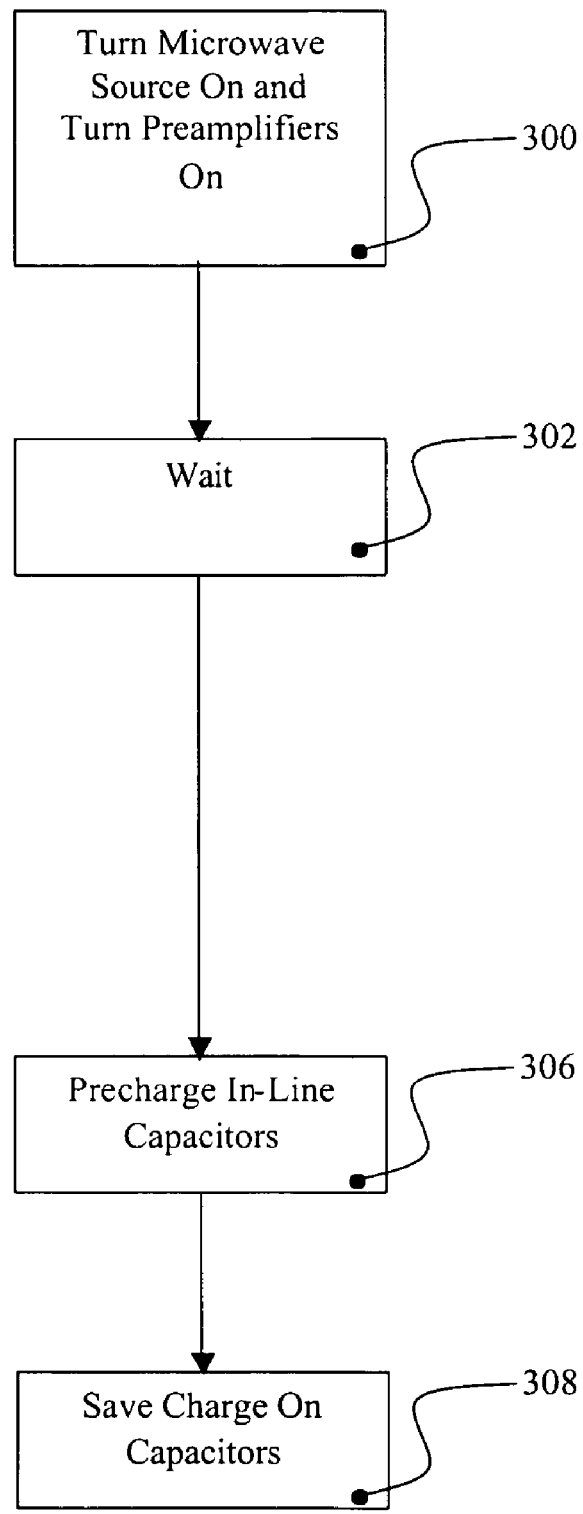
FIG. 3 is a flow chart illustrating the steps for preparing the speed sensor system.

FIG. 3 is a flow chart illustrating the steps for preparing the speed sensor system. In step 300, the microwave source of the speed sensor and the preamplifiers are turned on. In step 302, the system waits in order to stabilize the electronics after the microwave source is turned on. In step 306, the in-line capacitor is pre-charged. In step 308, the charge saver switch is closed.

The speed sensor has a calibration system that can be used at power up to check the speed sensor. Using a known oscillating target in front of the speed sensor a speed measurement can be made and compared against the known speed achieved for that target.

Figure 4:
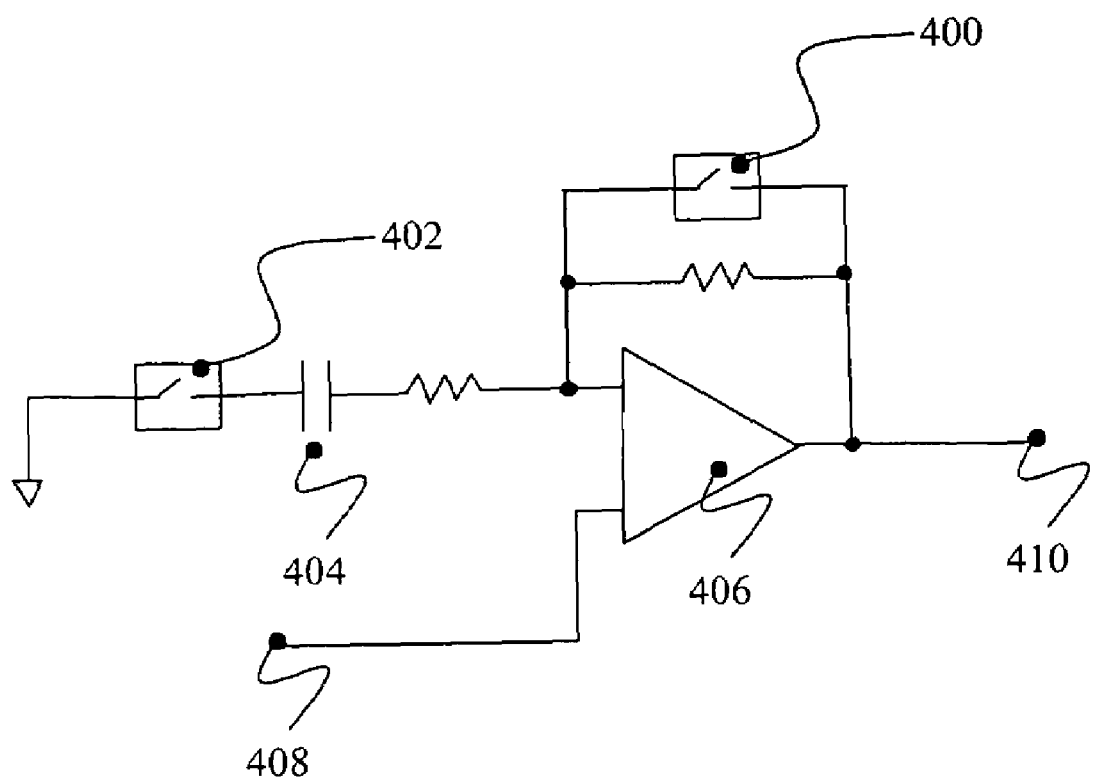
FIG. 4 is a circuit diagram illustrating a preamplifier in the speed sensor system.

FIG. 4 is a circuit diagram illustrating a preamplifier in the speed sensor system. Preamplifier 406 is designed to take the speed sensor signal input 408 and produce an amplified output 410. When switch 400 is closed the capacitor 404 is rapidly charged. When switch 402 is closed the charge saver function is off for capacitor 404. This method is used to rapidly stabilize the preamplifier signal path to prepare it for the data signal.

Figure 5:
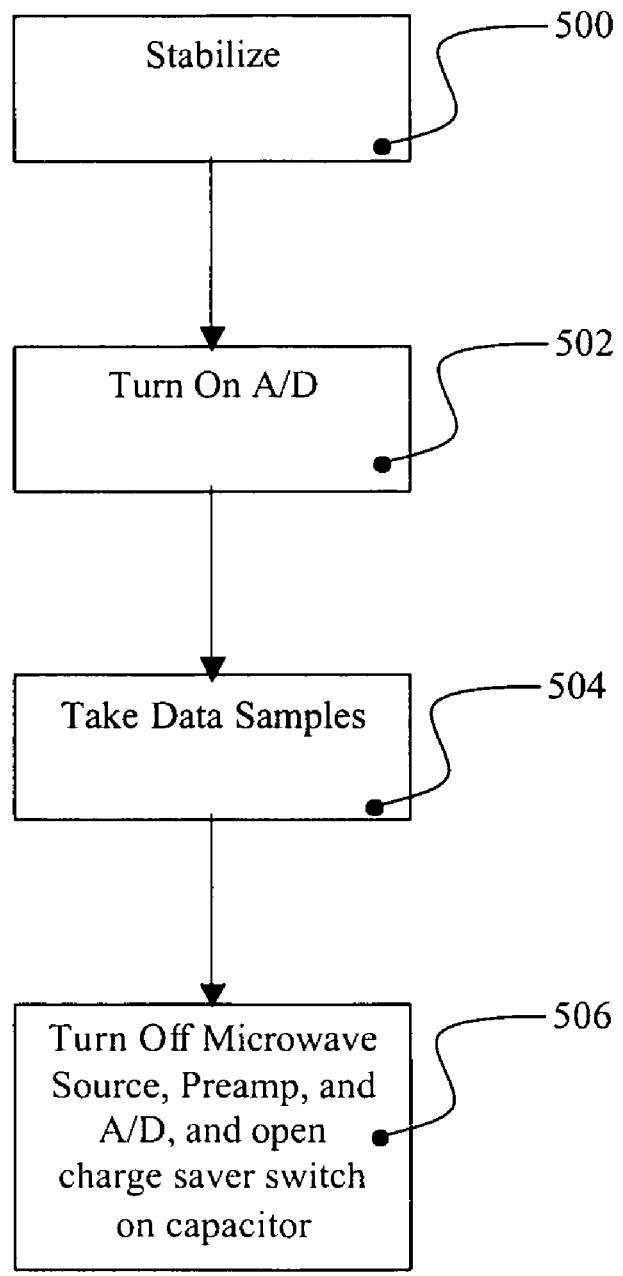
FIG. 5 is a flow chart illustrating the steps for acquiring speed sensor data.

FIG. 5 is a flow chart illustrating the steps for acquiring speed sensor data. In step 500, the acquisition system electronics is allowed to stabilize. In step 502, the analog-to-digital (A/D) converter is turned on. In step 504, the data samples required to measure speed and direction are taken. For direction, the sine and cosine components of the back-reflected microwave signal are sampled. In step 506, the microwave source, preamplifiers, and A/D converter are turned off again to preserve power, and the charge saver switch is opened to preserve the capacitor charge until the next measurement.

Figure 6:
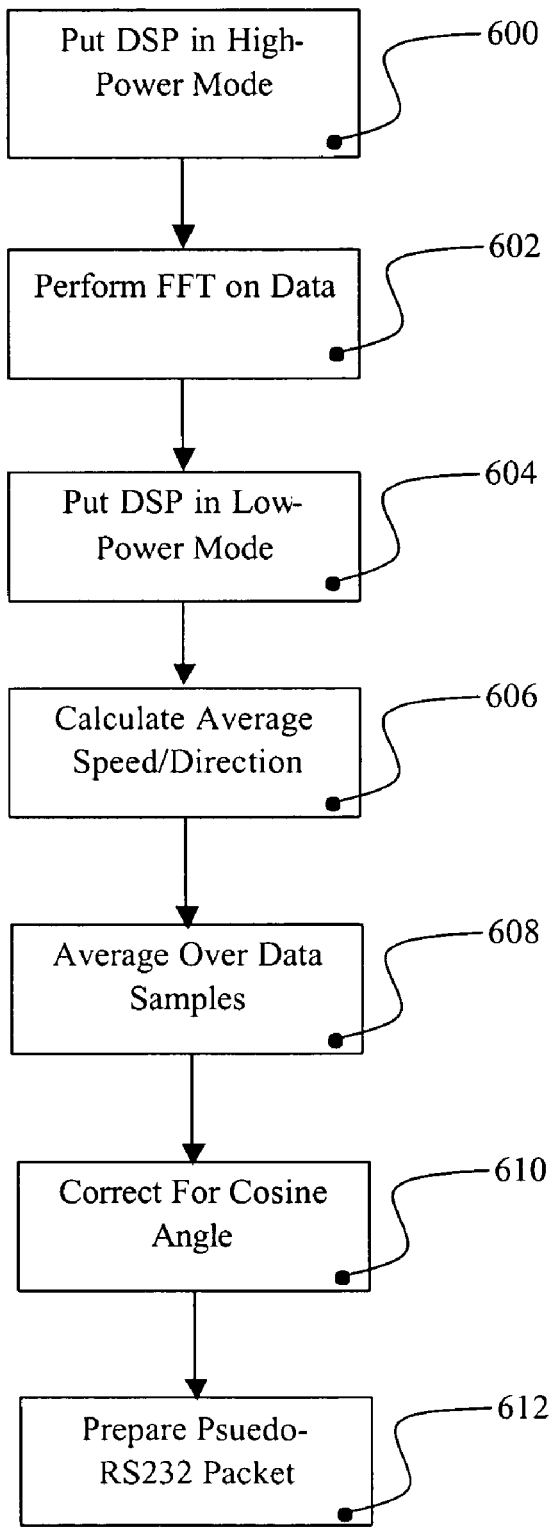
FIG. 6 is a flow chart illustrating the steps for processing the speed sensor data.

FIG. 6 is a flow chart illustrating the steps for processing the speed sensor data. In step 600, the digital signal processor (DSP) is placed in high-power mode. In step 602, the DSP calculates speed information in both directions by performing FFT analysis on the sine and cosine components of the speed sensor data. The DSP processes the return signal by separating it into its component frequencies, and splitting the frequencies into cohorts that correspond to 0.1 mph increments. The average speed is calculated by averaging the speed of all of the cohorts which were found to have a positive return from the Doppler radar signal. In step 604, the DSP is returned to low-power mode. In step 606, the average speeds for both directions of the traffic are calculated. In some embodiments, several traffic lanes are measured simultaneously. In addition in step 606, the high occupancy vehicle traffic speed can be separately calculated from the non-high occupancy vehicle traffic speed. In step 608, the speed information is averaged over a number of samples (e.g. four samples where a sample is taken every 250 milliseconds). In step 610, the average speed information is corrected for the angle that the speed sensor is placed at with respect to the road. In some embodiments, the angle correction is performed after the information is sent to the server. In step 612, the calculated speed information is placed into a psuedo-RS232 packet to be transmitted over the wireless data modem to a server.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of sensing vehicle speed comprising:
   self-powering a speed sensor, wherein the speed sensor comprises a Doppler speed sensor that includes a microwave source and a microwave receiver, which are designed to measure a speed corresponding to one or more objects using a Doppler shift in a microwave that a) originated from the microwave source, b) was received at the microwave receiver, and c) was back-reflected from one of the one or more objects;
   taking a sample of Doppler speed sensor data from the Doppler speed sensor;
   processing the sample of Doppler speed sensor data to calculate one or more speeds corresponding to the one or more objects;
   determining a traffic speed based at least in part on the one or more speeds calculated using the sample of Doppler speed sensor data; and
   wirelessly transmitting the traffic speed to a server.

2. A method of sensing vehicle speed comprising:
   self-powering a speed sensor, wherein the speed sensor comprises a Doppler speed sensor that includes a microwave source and a microwave receiver, which are designed to measure a speed corresponding to one or more objects using a Doppler shift in a microwave that a) originated from the microwave source, b) was received at the microwave receiver, and c) was back-reflected from one of the one or more objects;
   taking a sample of Doppler speed sensor data from the Doppler speed sensor, wherein taking the sample of Doppler speed sensor data includes turning on a preamplifier in the Doppler speed sensor, wherein the preamplifier is turned on to be stabilized before taking the sample of Doppler speed sensor data;
   processing the sample of Doppler speed sensor data to calculate one or more speeds corresponding to the one or more objects;
   determining a traffic speed based at least in part on the one or more speeds calculated using the sample of Doppler speed sensor data; and
   wirelessly transmitting the traffic speed to a server.

3. A method of sensing vehicle speed comprising:
   self-powering a speed sensor, wherein the speed sensor comprises a Doppler speed sensor that includes a microwave source and a microwave receiver, which are designed to measure a speed corresponding to one or more objects using a Doppler shift in a microwave that a) originated from the microwave source, b) was received at the microwave receiver, and c) was back-reflected from one of the one or more objects;
   taking a sample of Doppler speed sensor data from the Doppler speed sensor, wherein taking the sample of Doppler speed sensor data includes precharging in-line capacitors in the Doppler speed sensor, wherein the in-line capacitors are in a signal path used in taking the sample of Doppler speed sensor data from the Doppler speed sensor;
   processing the sample of Doppler speed sensor data to calculate one or more speeds corresponding to the one or more objects;
   determining a traffic speed based at least in part on the one or more speeds calculated using the sample of Doppler speed sensor data; and
   wirelessly transmitting the traffic speed to a server.

4. A method of sensing vehicle speed comprising:
   self-powering a speed sensor, wherein the speed sensor comprises a Doppler speed sensor that includes a microwave source and a microwave receiver, which are designed to measure a speed corresponding to one or more objects using a Doppler shift in a microwave that a) originated from the microwave source, b) was received at the microwave receiver, and c) was back-reflected from one of the one or more objects;
   taking a sample of Doppler speed sensor data from the Doppler speed sensor, wherein a frequency of taking the sample of Doppler speed sensor data from the Doppler speed sensor depends on the remaining amount of battery power;
processing the sample of Doppler speed sensor data to calculate one or more speeds corresponding to the one or more objects;
determining a traffic speed based at least in part on the one or more speeds calculated using the sample of Doppler speed sensor data; and
wirelessly transmitting the traffic speed to a server.

5. A method of sensing vehicle speed comprising:
self-powering a speed sensor, wherein the speed sensor comprises a Doppler speed sensor that includes a microwave source and a microwave receiver, which are designed to measure a speed corresponding to one or more objects using a Doppler shift in a microwave that a) originated from the microwave source, b) was received at the microwave receiver, and c) was back-reflected from one of the one or more objects;
taking a sample of Doppler speed sensor data from the Doppler speed sensor, wherein a frequency of taking the sample of Doppler speed sensor data from the Doppler speed sensor depends on the speed of the vehicles, wherein the frequency is lower when traffic is at normal speed and higher when traffic is at slow speed;
processing the sample of Doppler speed sensor data to calculate one or more speeds corresponding to the one or more objects;
determining a traffic speed based at least in part on the one or more speeds calculated using the sample of Doppler speed sensor data; and
wirelessly transmitting the traffic speed to a server.

6. A method of sensing vehicle speed comprising:
self-powering a speed sensor, wherein the speed sensor comprises a Doppler speed sensor that includes a microwave source and a microwave receiver, which are designed to measure a speed corresponding to one or more objects using a Doppler shift in a microwave that a) originated from the microwave source, b) was received at the microwave receiver, and c) was back-reflected from one of the one or more objects;
taking a sample of Doppler speed sensor data from the Doppler speed sensor;
processing the sample of Doppler speed sensor data to calculate one or more speeds corresponding to the one or more objects, wherein the processing the sample of Doppler speed sensor data to calculate a calculated speed includes correcting for the angle that the speed sensor is placed at with respect to the road;
determining a traffic speed based at least in part on the one or more speeds calculated using the sample of Doppler speed sensor data; and
wirelessly transmitting the traffic speed to a server.

7. A system for sensing vehicle speed comprising:
a self-powered speed sensor, wherein the speed sensor comprises a Doppler speed sensor that includes a microwave source and a microwave receiver, which are designed to measure a speed corresponding to one or more objects using a Doppler shift in a microwave that a) originated from the microwave source, b) was received at the microwave receiver, and c) was back-reflected from one of the one or more objects;
a sampler capable of taking a sample of Doppler speed sensor data from the Doppler speed sensor;
a processor capable of processing the sample of Doppler speed sensor data to calculate one or more speeds corresponding to the one or more objects;
a determiner capable of determining a traffic speed based at least in part on the one or more speeds calculated using the sample of Doppler speed sensor data; and
a transmitter capable of wirelessly transmitting the traffic speed to a server.

8. A system as in claim 7, wherein the traffic speed is a traffic speed associated with one of a plurality of traffic lane speeds.

9. A system as in claim 7, wherein the traffic speed corresponds to a high occupancy vehicle lane speed.

10. A system as in claim 7, further comprising a power manager, wherein the power manager intelligently turns off power hungry circuitry except when necessary.

11. A system for sensing vehicle speed comprising:
a self-powered speed sensor, wherein the speed sensor comprises a Doppler speed sensor that includes a microwave source and a microwave receiver, which are designed to measure a speed corresponding to one or more objects using a Doppler shift in a microwave that a) originated from the microwave source, b) was received at the microwave receiver, and c) was back-reflected from one of the one or more objects;
a sampler capable of taking a sample of Doppler speed sensor data from the speed sensor, wherein taking the sample of Doppler speed sensor data includes turning on a preamplifier in the Doppler speed sensor, wherein the preamplifier is turned on to be stabilized before taking the sample of Doppler speed sensor data;
a processor capable of processing the sample of Doppler speed sensor data to calculate one or more speeds corresponding to the one or more objects;
a determiner capable of determining a traffic speed based at least in part on the one or more speeds calculated using the sample of Doppler speed sensor data; and
a transmitter capable of wirelessly transmitting the traffic speed to a server.

12. A system for sensing vehicle speed comprising:
a self-powered speed sensor, wherein the speed sensor comprises a Doppler speed sensor that includes a microwave source and a microwave receiver, which are designed to measure a speed corresponding to one or more objects using a Doppler shift in a microwave that a) originated from the microwave source, b) was received at the microwave receiver, and c) was back-reflected from one of the one or more objects;
a sampler capable of taking a sample of Doppler speed sensor data from the Doppler speed sensor, wherein taking the sample of Doppler speed sensor data includes precharging in-line capacitors in the Doppler speed sensor, wherein the in-line capacitors are in a signal path used in taking the sample of Doppler speed, sensor data from the Doppler speed sensor;
a processor capable of processing the sample of Doppler speed sensor data to calculate one or more speeds corresponding to the one or more objects;
a determiner capable of determining a traffic speed based at least in part on the one or more speeds calculated using the sample of Doppler speed sensor data; and
a transmitter capable of wirelessly transmitting the traffic speed to a server.

13. A system for sensing vehicle speed comprising:
a self-powered speed sensor, wherein the speed sensor comprises a Doppler speed sensor that includes a microwave source and a microwave receiver, which are designed to measure a speed corresponding to one or more objects using a Doppler shift in a microwave that a) originated from the microwave source, b) was received at the microwave receiver, and c) was back-reflected from one of the one or more objects;

a sampler capable of taking a sample of Doppler speed sensor data from the Doppler speed sensor, wherein a frequency of taking the sample of Doppler speed sensor data from the Doppler speed sensor depends on the remaining amount of battery power;

a processor capable of processing the sample of Doppler speed sensor data to calculate one or more speeds corresponding to the one or more objects;

a determiner capable of determining a traffic speed based at least in part on the one or more speeds calculated using the sample of Doppler speed sensor data; and a transmitter capable of wirelessly transmitting the traffic speed to a server.

14. A system for sensing vehicle speed comprising:

a self-powered speed sensor, wherein the speed sensor comprises a Doppler speed sensor that includes a microwave source and a microwave receiver, which are designed to measure a speed corresponding to one or more objects using a Doppler shift in a microwave that a) originated from the microwave source, b) was received at the microwave receiver, and c) was back-reflected from one of the one or more objects;

a sampler capable of taking a sample of Doppler speed sensor data from the Doppler speed sensor, wherein a frequency of taking the sample of Doppler speed sensor data from the Doppler speed sensor depends on the speed of the vehicles, wherein the frequency is lower when traffic is at normal speed and higher when traffic is at slow speed;

a processor capable of processing the sample of Doppler speed sensor data to calculate one or more speeds corresponding to the one or more objects;

a determiner capable of determining a traffic speed based at least in part on the one or more speeds calculated using the sample of Doppler speed sensor data; and a transmitter capable of wirelessly transmitting the traffic speed to a server.

15. A system for sensing vehicle speed comprising:

a self-powered speed sensor, wherein the speed sensor comprises a Doppler speed sensor that includes a microwave source and a microwave receiver, which are designed to measure a speed corresponding to one or more objects using a Doppler shift in a microwave that a) originated from the microwave source, b) was received at the microwave receiver, and c) was back-reflected from one of the one or more objects;

a sampler capable of taking a sample of Doppler speed sensor data from the Doppler speed sensor;

a processor capable of processing the sample of Doppler speed sensor data to calculate one or more speeds corresponding to the one or more objects, wherein the processing the sample of Doppler speed sensor data to calculate a calculated speed includes correcting for the angle that the Doppler speed sensor is placed at with respect to the road;

a determiner capable of determining a traffic speed based at least in part on the one or more speeds calculated using the sample of Doppler speed sensor data; and a transmitter capable of wirelessly transmitting the traffic speed to a server.

16. A system as in claim 8, wherein the plurality of traffic lane speeds include a traffic lane speed for each of two directions of travel on a road.

* * * * *